United States Patent
Ning et al.

(10) Patent No.: US 11,332,380 B2
(45) Date of Patent: May 17, 2022

(54) METHOD FOR ALUMINUM-ENHANCED DEALKALIZATION OF RED MUD AND SEPARATION AND RECOVERY OF ALUMINUM AND IRON

(71) Applicant: Kunming University of Science and Technology, Kunming (CN)

(72) Inventors: Ping Ning, Kunming (CN); Senlin Tian, Kunming (CN); Jianhong Huang, Kunming (CN); Yunjian Chen, Kunming (CN); Xuewei Hu, Kunming (CN); Yingjie Li, Kunming (CN)

(73) Assignee: Kunming University of Science and Technology, Kunming (CN)

( * ) Notice: Subject to any disclaimer, the term of this patent is extended or adjusted under 35 U.S.C. 154(b) by 268 days.

(21) Appl. No.: 16/820,982

(22) Filed: Mar. 17, 2020

(65) Prior Publication Data

US 2020/0299145 A1    Sep. 24, 2020

(30) Foreign Application Priority Data

Mar. 22, 2019   (CN) .......................... 201910223314.0

(51) Int. Cl.
*B01D 53/50*     (2006.01)
*B01D 53/80*     (2006.01)
(Continued)

(52) U.S. Cl.
CPC .............. *C01F 7/066* (2013.01); *B01D 53/50* (2013.01); *B01D 53/80* (2013.01); *C01F 7/0646* (2013.01);
(Continued)

(58) Field of Classification Search
CPC ........ C01G 49/06; C01F 7/066; C01F 7/0646; Y02P 10/20; C22B 21/0015; C22B 3/06; C22B 3/22; B01D 2257/302; B01D 53/50; B01D 53/502; B01D 53/80; B01D 2251/30; B01D 2258/0283; B01D 2251/60; B01D 2251/508
See application file for complete search history.

(56) References Cited

U.S. PATENT DOCUMENTS

| | | | | |
|---|---|---|---|---|
| 4,341,745 A | * | 7/1982 | Zopff .................... | B01D 53/40 252/191 |
| 5,051,243 A | * | 9/1991 | Fulford .................. | C09K 8/145 423/131 |
| 10,273,561 B2 | * | 4/2019 | Morris .................... | C22B 1/02 |

FOREIGN PATENT DOCUMENTS

| | | | | |
|---|---|---|---|---|
| ES | 2 024 358 A6 | * | 2/1992 | ............. C09K 17/08 |
| JP | 02111627 A | * | 4/1990 | ........... C01G 23/052 |

* cited by examiner

*Primary Examiner* — Timothy C Vanoy
(74) *Attorney, Agent, or Firm* — NSIP Law

(57) ABSTRACT

The present invention discloses a method for aluminum-enhanced dealkalization of red mud and separation and recovery of aluminum and iron. The method includes: dissolving red mud in water, introducing excessive $SO_2$, introducing $O_2$ for aeration, and refluxing part of alkaline leachate after filtering; when pH of a red mud mixture decreases to below 3, washing and filtering the red mud mixture, adding NaOH to acidic leachate to adjust its pH to a strongly alkaline level, aging and filtering the leachate, treating filter residue to recover $Fe_2O_3$, and refluxing part of alkaline leachate after filtering to the red mud mixture; and adjusting pH of the remaining alkaline leachate after filtering to a weakly acidic level, and conducting filtering to recover aluminum.

10 Claims, 1 Drawing Sheet

(51) Int. Cl.
  *C01F 7/06* (2022.01)
  *C01G 49/06* (2006.01)
  *C22B 3/06* (2006.01)
  *C22B 3/22* (2006.01)
  *C22B 21/00* (2006.01)
  *C01F 7/066* (2022.01)
  *C01F 7/0646* (2022.01)

(52) U.S. Cl.
  CPC ............... *C01G 49/06* (2013.01); *C22B 3/06* (2013.01); *C22B 3/22* (2013.01); *C22B 21/0015* (2013.01); *B01D 2251/60* (2013.01); *B01D 2257/302* (2013.01)

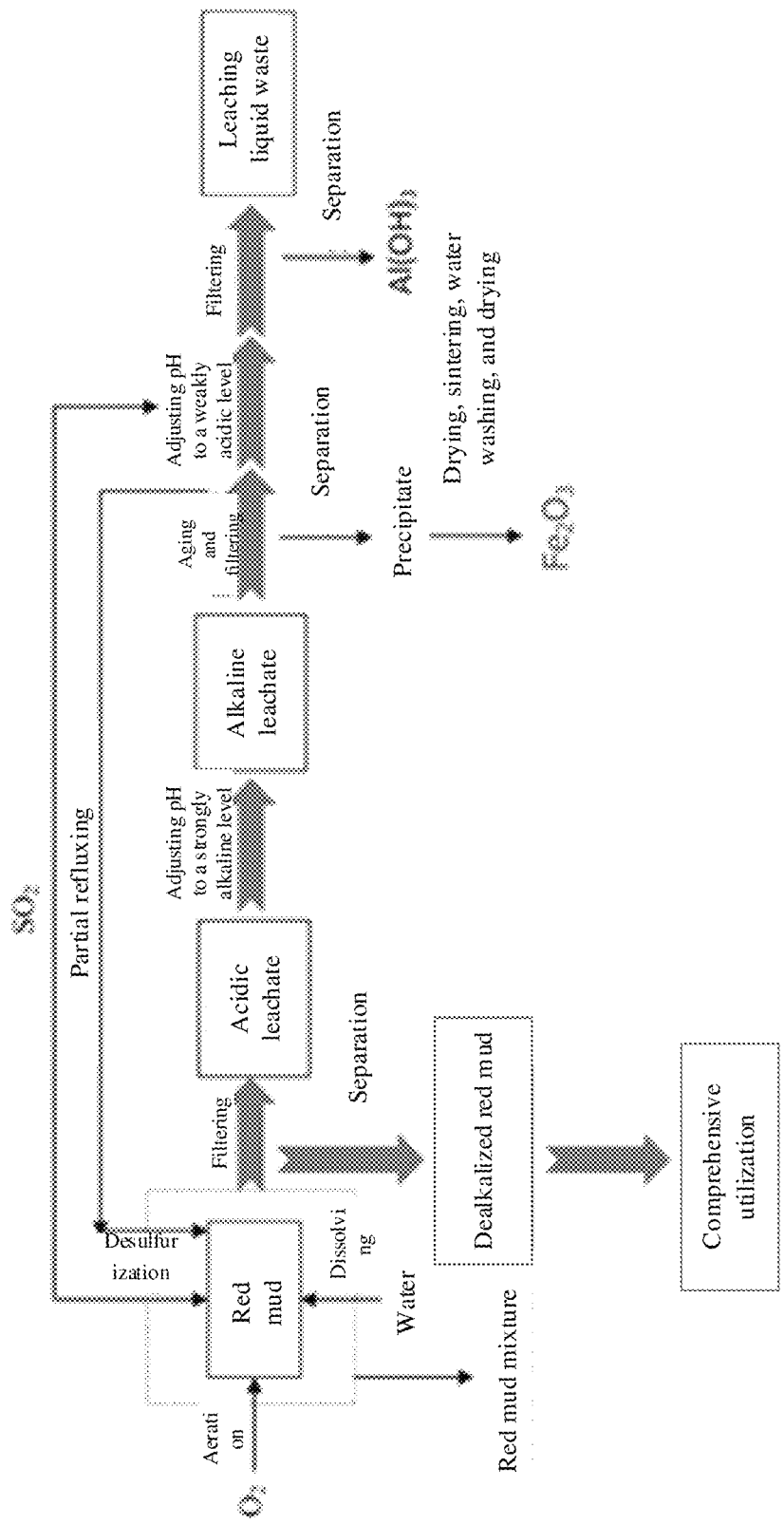

METHOD FOR ALUMINUM-ENHANCED DEALKALIZATION OF RED MUD AND SEPARATION AND RECOVERY OF ALUMINUM AND IRON

CROSS-REFERENCE TO RELATED APPLICATIONS

This application claims the benefit under 35 USC 119(a) of Chinese Patent Application No. 201910223314.0 filed on Mar. 22, 2019 in the State Intellectual Property Office of the People's Republic of China, the entire disclosure of which is incorporated herein by reference for all purposes.

TECHNICAL FIELD

The present invention belongs to the metallurgy field and the environmental protection field and further belongs to the technical field of industrial flue gas pollutant control, and specifically relates to a method for aluminum-enhanced dealkalization of red mud and separation and recovery of aluminum and iron.

BACKGROUND

Red mud is polluting waste residue discharged from the alumina industry. Approximately 1-1.8 tons of red mud is produced when every one ton of alumina is produced. As the fourth largest alumina-producing country, China discharges more than 5.5 million tons of red mud every year. Currently, red mud is mostly stockpiled in red mud reservoirs (dams) by a wet process or dehydrated and dried. This not only occupies certain farmland, but also brings hidden danger of dam break. Red mud contains 3%-10% of $Na_2O$. Therefore, the red mud is strongly alkaline and can easily cause soil and groundwater pollution if being inappropriately stockpiled. In addition, the dust formed by bare red mud flies in the wind and pollutes the air, causing adverse effects on the survival of human, animals, and plants and deteriorating the ecological environment. Moreover, relatively high content metal resources such as Fe and Al in the red mud are not fully utilized, resulting in a waste of resources.

During industrialization development, especially in the production of the power and steel industries, a large amount of fuel and ore are consumed and a large amount of sulfur-containing flue gas is produced. Currently, the $SO_2$ emission has been controlled in China based on a total emission and an emission concentration according to a very strict standard. Both existing enterprises and new enterprises should be equipped with flue gas desulfurization devices to meet the national standard of the $SO_2$ emission.

Currently, the research on red mud mainly focuses on dealkalization treatment and comprehensive utilization of the red mud. For the development and utilization of red mud, researchers have carried out the research on building materials, adsorption materials, filling materials, agricultural fertilizers, organic metal recovery, etc. However, most of the research is in the theoretical stage. Therefore, the overall comprehensive utilization of red mud is only approximately 15%.

Chinese scholars have carried out a lot of research on this issue. For example, the patent CN106746414A titled "A reaction furnace for simultaneously dealkalizing red mud and drying the red mud raw material without direct heating" proposes a method for drying and dealkalizing red mud by using waste heat without an external heat source. The patent CN108640446A titled "A compound organic acid-based red mud dealkalization agent and a red mud dealkalization method" proposes a method for dealkalizing red mud by using a compound organic acid-based red mud dealkalization agent prepared from pyroligneous liquor, sulfamic acid, and a chelating agent. The patent CN106865923A titled "A process for dealkalizing and recovering red mud by electrodialysis coupled with ion exchange resin" proposes a method for dealkalizing and recycling red mud by coupling an electrodialysis technology with an ion exchange resin material. All these methods can achieve a good effect of dealkalizing red mud, but they use complex technologies and consume relatively high energy. Therefore, it is difficult to implement industrialization by using these methods, or costs of the industrial production are relatively high.

SUMMARY

An objective of the present invention is to provide a method that has low treatment costs and a good dealkalization effect, can realize waste control by waste, and can easily realize industrial dealkalization of red mud. The method can absorb $SO_2$ waste gas to remove alkalis from red mud, recover part of aluminum and iron, and comprehensively utilize dealkalized red mud.

The objective of the present invention is achieved by a method including the following steps:

S1: grinding red mud and dissolving the red mud in slurry liquid, where the slurry liquid is water and/or alkaline leachate obtained after filtering; uniformly stirring the mixture to obtain red mud slurry; introducing $SO_2$ and $O_2$ for aeration oxidation to obtain a red mud mixture; and filtering the red mud mixture to obtain dealkalized red mud and acidic leachate; and S2: adjusting pH of the acidic leachate obtained by filtering to a strongly alkaline level to obtain alkaline leachate; filtering the alkaline leachate to obtain alkaline leachate after filtering and filter residue; drying and sintering the filter residue, washing an obtained product with water, and conducting drying to recover $Fe_2O_3$; returning ⅕-½ of the alkaline leachate after filtering to step (1) as the slurry liquid; and adjusting pH of the remaining alkaline leachate after filtering to a weakly acidic level, and conducting filtering to separate and recover $Al(OH)_3$.

Further, in step (1), the red mud is ground into a particle size of 100-200 meshes.

Further, a liquid-solid ratio of the red mud slurry is 7:1.

Further, in step (1), $SO_2$ is introduced by allowing the $SO_2$ gas to be in reverse contact with the red mud slurry for absorption.

Further, in step (1), the introduction amount of the $SO_2$ gas is 1-12 L per $m^3$ of the red mud slurry.

Further, in step (1), an introduction volume ratio of the $O_2$ gas to the $SO_2$ gas is 1:(1-5).

Further, washing needs to be conducted 3-8 times after filtering.

Further, in step (1), pH of the red mud mixture needs to be below 3.

Further, in step (2), pH of the alkaline leachate needs to be above 13.

Further, in step (2), the weak acidity means that pH needs to be above 4.7.

The following reaction equations are mainly involved in the whole process:

(1) Reaction during the preimpregnation: Red mud+$H_2O \rightarrow NaOH + Ca(OH)_2$ (2) Main reaction during the desulfurization:

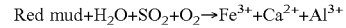

Red mud+$H_2O$+$SO_2$+$O_2 \rightarrow Fe^{3+}+Ca^{2+}+Al^{3+}$ (3) Main reactions during the precipitation separation: (pH≥13)

$$Fe^{3+}+Ca^{2+}+OH^-\rightarrow Ca(OH)_2\downarrow+Fe(OH)_3\downarrow$$

$$Al^{3+}+OH^-\rightarrow Al(OH)_3\downarrow+OH^-\rightarrow AlO_2^-+H_2O$$

(4) Reaction for aluminum recovery: (pH≈4.7)

$$AlO_2^-+H^+\rightarrow Al^{3+}+H_2O\rightarrow Al(OH)_3\downarrow$$

(5) Aluminum-enhanced dealkalization reaction:

$$Na_2O.Al_2O_3.1.7SiO_2.nH_2O+6Al^{3+}\rightarrow 4Al_2O_3.xSiO_2.(6-2x)H_2O+2NaOH$$

Compared with the prior art, beneficial effects of the present invention are as follows:

1. In the method of the present invention, $SO_2$ is used to acidify a red mud mixture. This can not only dealkalize red mud, but also treat sulfur-containing industrial waste gas, thereby realizing waste control by waste and reducing industrial operation costs. Therefore, the present invention has good environmental and economic benefits.

2. In the method of the present invention, part of alkaline leachate containing $Al^{3+}$ is refluxed to the red mud mixture. This can increase the absorption amount of $SO_2$ and treat more sulfur-containing waste gas. In addition, $Al^{3+}$ in the reflux liquid can be subject to the replacement reaction with bound alkalis in the red mud mixture, so as to enhance the dealkalization of red mud.

3. In the method of the present invention, pH of the red mud mixture after filtering is adjusted to above 13, so that metal ions in the mixture such as $Ca^{2+}$ and $Fe^{3+}$ can form $Ca(OH)_2$ and $Fe(OH)_3$ precipitate to be removed; and the precipitate filter residue is dried and sintered, and an obtained product is washed with water and dried to recover $Fe_2O_3$, while $Al^{3+}$ is still dissolved in strongly alkaline leachate, facilitating reflux to enhance the dealkalization of red mud and aluminum recovery.

4. In the method of the present invention, alkaline leachate after filtering continues to be acidified by $SO_2$, and its pH is adjusted to a weak acid level of 4.7, so that $Al^{3+}$ can form $Al(OH)_3$ precipitate, so as to recover aluminum.

5. In the method of the present invention, sulfuric acid produced through treatment of the $SO_2$ waste gas is used to neutralize red mud; and aluminum is used to enhance the dealkalization of red mud. In this way, dealkalized red mud has lower alkalinity and less metal impurities, and therefore has multiple utilization ways.

6. In the present invention, red mud is dissolved in water, excessive $SO_2$ is introduced, oxygen gas is introduced for aeration, and part of alkaline leachate after filtering is refluxed; when pH of a red mud mixture decreases to below 3, the red mud mixture is washed and filtered, NaOH is added to acidic leachate to adjust its pH to a strongly alkaline level, the leachate is aged and filtered, filter residue is dried and sintered, an obtained product is washed with water and dried to recover $Fe_2O_3$, and part of alkaline leachate after filtering is refluxed to the red mud mixture; and pH of the remaining alkaline leachate after filtering is adjusted to a weakly acidic level, and is filtered to recover aluminum. In the method of the present invention, $SO_2$ is introduced to the red mud mixture for acidification to implement desulfurization, achieving good environmental and economic benefits; and part of alkaline leachate after filtering that contains $Al^{3+}$ is refluxed to the red mud mixture to enhance the dealkalization of red mud; almost pure $Fe_2O_3$ can be obtained by conducting steps such as drying, sintering, water washing, and drying on the filter residue obtained by filtering the alkaline leachate; and pH of the remaining alkaline leachate after filtering is adjusted to a weakly acidic level, and $Al(OH)_3$ can recovered by filtering.

7. The method can simultaneously implement deep desulfurization and comprehensive utilization of red mud resources, has a simple process and high desulfurization efficiency, and can thoroughly dealkalize red mud with low energy consumption and a good effect. Moreover, the method can realize waste control by waste, has low costs, can recover metal resources, and is easy for automatic and large-scale operation.

BRIEF DESCRIPTION OF DRAWINGS

The FIGURE is a flowchart of a process according to the present invention.

DETAILED DESCRIPTION

The present invention is further described below with reference to embodiments and accompanying drawings without limiting the present invention in any way. Any transformation or replacement made based on the teachings of the present invention shall fall within the protection scope of the present invention.

Embodiment 1

A method for aluminum-enhanced dealkalization of red mud and separation and recovery of aluminum and iron is provided, including the following steps:

S1: grinding red mud to 100 meshes, and dissolving the red mud in slurry liquid, where the slurry liquid is water and alkaline leachate obtained after filtering; uniformly stirring the mixture to obtain red mud slurry, where a liquid-solid ratio is 7:1; preparing $SO_2$ flue gas of a certain concentration in a buffer bottle by an air compressor with exhaust gas produced by calcination of pyrite in a rotary calcining kiln; introducing sulfur-containing flue gas into the red mud slurry at a blast rate of 0.4 $m^3$/h in a form of reverse contact for mixing; conducting aeration oxidation to obtain a red mud mixture, where the introduction amount of the $SO_2$ gas is 12 L per $m^3$ of red mud slurry, an introduction volume ratio of $O_2$ gas to the $SO_2$ gas is 1:1, and pH of the red mud slurry reaches below 3; and filtering the red mud mixture, and conducting washing three times to obtain dealkalized red mud and acidic leachate; and S2: adjusting pH of the acidic leachate obtained by filtering to 13 to obtain alkaline leachate; filtering the alkaline leachate, and conducting washing three times to obtain alkaline leachate after filtering and filter residue; drying and sintering the filter residue, washing an obtained product with water, and conducting drying to recover $Fe_2O_3$; returning ⅕ of the alkaline leachate after filtering to step (1) as the slurry liquid; and adjusting pH of the remaining alkaline leachate after filtering to 4.7, and conducting filtering to separate and recover $Al(OH)_3$.

Embodiment 2

A method for aluminum-enhanced dealkalization of red mud and separation and recovery of aluminum and iron is provided, including the following steps:

S1: grinding red mud to 200 meshes, and dissolving the red mud in slurry liquid, where the slurry liquid is water and alkaline leachate obtained after filtering; uniformly stirring the mixture to obtain red mud slurry, where a liquid-solid ratio is 7:1; preparing $SO_2$ flue gas of a certain concentration in a buffer bottle by an air compressor with exhaust gas produced by calcination of pyrite in a rotary calcining kiln; introducing sulfur-containing flue gas into the red mud slurry at a blast rate of 1 m³/h in a form of reverse contact for mixing; conducting aeration oxidation to obtain a red mud mixture, where the introduction amount of the $SO_2$ gas is 1 L per m³ of red mud slurry, an introduction volume ratio of $O_2$ gas to the $SO_2$ gas is 1:5, and pH of the red mud slurry reaches below 3; and filtering the red mud mixture, and conducting washing eight times to obtain dealkalized red mud and acidic leachate; and S2: adjusting pH of the acidic leachate obtained by filtering to above 13 to obtain alkaline leachate; filtering the alkaline leachate, and conducting washing six times to obtain alkaline leachate after filtering and filter residue; drying and sintering the filter residue, washing an obtained product with water, and conducting drying to recover $Fe_2O_3$; returning 1/5 of the alkaline leachate after filtering to step (1) as the slurry liquid; and adjusting pH of the remaining alkaline leachate after filtering to 4.7, and conducting filtering to separate and recover $Al(OH)_3$.

Embodiment 3

A method for aluminum-enhanced dealkalization of red mud and separation and recovery of aluminum and iron is provided, including the following steps:

S1: grinding red mud to 120 meshes, and dissolving the red mud in slurry liquid, where the slurry liquid is water and alkaline leachate obtained after filtering; uniformly stirring the mixture to obtain red mud slurry, where a liquid-solid ratio is 7:1; preparing $SO_2$ flue gas of a certain concentration in a buffer bottle by an air compressor with exhaust gas produced by calcination of pyrite in a rotary calcining kiln; introducing sulfur-containing flue gas into the red mud slurry at a blast rate of 1.5 m³/h in a form of reverse contact for mixing; conducting aeration oxidation to obtain a red mud mixture, where the introduction amount of the $SO_2$ gas is 4 L per m³ of red mud slurry, an introduction volume ratio of $O_2$ gas to the $SO_2$ gas is 1:2, and pH of the red mud slurry reaches below 3; and filtering the red mud mixture, and conducting washing four times to obtain dealkalized red mud and acidic leachate; and S2: adjusting pH of the acidic leachate obtained by filtering to 13.5 to obtain alkaline leachate; filtering the alkaline leachate, and conducting washing five times to obtain alkaline leachate after filtering and filter residue; drying and sintering the filter residue, washing an obtained product with water, and conducting drying to recover $Fe_2O_3$; returning 1/5 of the alkaline leachate after filtering to step (1) as the slurry liquid; and adjusting pH of the remaining alkaline leachate after filtering to 4.7, and conducting filtering to separate and recover $Al(OH)_3$.

Embodiment 4

A method for aluminum-enhanced dealkalization of red mud and separation and recovery of aluminum and iron is provided, including the following steps:

S1: grinding red mud to 150 meshes, and dissolving the red mud in slurry liquid, where the slurry liquid is water; conducting uniform stirring to obtain red mud slurry, where a liquid-solid ratio is 7:1; preparing $SO_2$ flue gas of a certain concentration in a buffer bottle by an air compressor with exhaust gas produced by calcination of pyrite in a rotary calcining kiln; introducing sulfur-containing flue gas into the red mud slurry at a blast rate of 2 m³/h in a form of reverse contact for mixing; conducting aeration oxidation to obtain a red mud mixture, where the introduction amount of the $SO_2$ gas is 8 L per m³ of red mud slurry, an introduction volume ratio of $O_2$ gas to the $SO_2$ gas is 1:3, and pH of the red mud slurry reaches below 3; and filtering the red mud mixture to obtain dealkalized red mud and acidic leachate; and S2: adjusting pH of the acidic leachate obtained by filtering to 13.2 to obtain alkaline leachate; filtering the alkaline leachate to obtain alkaline leachate after filtering and filter residue; drying and sintering the filter residue, washing an obtained product with water, and conducting drying to recover $Fe_2O_3$; returning 1/5 of the alkaline leachate after filtering to step (1) as the slurry liquid; and adjusting pH of the remaining alkaline leachate after filtering to 4.7, and conducting filtering to separate and recover $Al(OH)_3$.

Embodiment 5

A method for aluminum-enhanced dealkalization of red mud and separation and recovery of aluminum and iron is provided, including the following steps:

S1: grinding red mud to 180 meshes, and dissolving the red mud in slurry liquid, where the slurry liquid is alkaline leachate obtained after filtering; uniformly stirring the mixture to obtain red mud slurry, where a liquid-solid ratio is 7:1; preparing $SO_2$ flue gas of a certain concentration in a buffer bottle by an air compressor with exhaust gas produced by calcination of pyrite in a rotary calcining kiln; introducing sulfur-containing flue gas into the red mud slurry at a blast rate of 3 m³/h in a form of reverse contact for mixing; conducting aeration oxidation to obtain a red mud mixture; and filtering the red mud mixture to obtain dealkalized red mud and acidic leachate; and S2: adjusting pH of the acidic leachate obtained by filtering to above 13 to obtain alkaline leachate; filtering the alkaline leachate to obtain alkaline leachate after filtering and filter residue; drying and sintering the filter residue, washing an obtained product with water, and conducting drying to recover $Fe_2O_3$; returning 1/5 of the alkaline leachate after filtering to step (1) as the slurry liquid; and adjusting pH of the remaining alkaline leachate after filtering to 4.7, and conducting filtering to separate and recover $Al(OH)_3$.

Embodiment 6

A method for aluminum-enhanced dealkalization of red mud and separation and recovery of aluminum and iron is provided, including the following steps:

S1: grinding red mud to 200 meshes, and dissolving the red mud in slurry liquid, where the slurry liquid is water and/or alkaline leachate obtained after filtering; uniformly stirring the mixture to obtain red mud slurry, where a liquid-solid ratio is 7:1; preparing $SO_2$ flue gas of a certain concentration in a buffer bottle by an air compressor with exhaust gas produced by calcination of pyrite in a rotary calcining kiln; introducing sulfur-containing flue gas into the red mud slurry at a blast rate of 3 m³/h in a form of reverse contact for mixing; conducting aeration oxidation to obtain a red mud mixture; and filtering the red mud mixture to obtain dealkalized red mud and acidic leachate; and S2: adjusting pH of the acidic leachate obtained by filtering to above 13 to obtain alkaline leachate; filtering the alkaline leachate to obtain alkaline leachate after filtering and filter residue; drying and sintering the filter residue, washing an obtained product with water, and conducting drying to recover $Fe_2O_3$; returning 1/4 of the alkaline leachate after filtering to step (1) as the slurry liquid; and adjusting pH of the remaining alkaline leachate after filtering to 4.7, and conducting filtering to separate and recover $Al(OH)_3$.

Embodiment 7

A method for aluminum-enhanced dealkalization of red mud and separation and recovery of aluminum and iron is provided, including the following steps:

S1: grinding red mud to 100 meshes, and dissolving the red mud in slurry liquid, where the slurry liquid is water and alkaline leachate obtained after filtering; uniformly stirring the mixture to obtain red mud slurry, where a liquid-solid ratio is 7:1; preparing $SO_2$ flue gas of a certain concentration in a buffer bottle by an air compressor with exhaust gas produced by calcination of pyrite in a rotary calcining kiln; introducing sulfur-containing flue gas into the red mud slurry at a blast rate of 3 $m^3/h$ in a form of reverse contact for mixing; conducting aeration oxidation to obtain a red mud mixture; and filtering the red mud mixture to obtain dealkalized red mud and acidic leachate; and S2: adjusting pH of the acidic leachate obtained by filtering to 13 to obtain alkaline leachate; filtering the alkaline leachate to obtain alkaline leachate after filtering and filter residue; drying and sintering the filter residue, washing an obtained product with water, and conducting drying to recover $Fe_2O_3$; returning ⅓ of the alkaline leachate after filtering to step (1) as the slurry liquid; and adjusting pH of the remaining alkaline leachate after filtering to 4.7, and conducting filtering to separate and recover $Al(OH)_3$.

Embodiment 8

A method for aluminum-enhanced dealkalization of red mud and separation and recovery of aluminum and iron is provided, including the following steps:

S1: grinding red mud to 200 meshes, and dissolving the red mud in slurry liquid, where the slurry liquid is water and alkaline leachate obtained after filtering; uniformly stirring the mixture to obtain red mud slurry, where a liquid-solid ratio is 7:1; preparing $SO_2$ flue gas of a certain concentration in a buffer bottle by an air compressor with exhaust gas produced by calcination of pyrite in a rotary calcining kiln; introducing sulfur-containing flue gas into the red mud slurry at a blast rate of 3 $m^3/h$ in a form of reverse contact for mixing; conducting aeration oxidation to obtain a red mud mixture; and filtering the red mud mixture to obtain dealkalized red mud and acidic leachate; and S2: adjusting pH of the acidic leachate obtained by filtering to 13 to obtain alkaline leachate; filtering the alkaline leachate to obtain alkaline leachate after filtering and filter residue; drying and sintering the filter residue, washing an obtained product with water, and conducting drying to recover $Fe_2O_3$; returning ½ of the alkaline leachate after filtering to step (1) as the slurry liquid; and adjusting pH of the remaining alkaline leachate after filtering to 4.7, and conducting filtering to separate and recover $Al(OH)_3$.

Embodiment 9

A desulfurization rate, Fe and Al recovery rates, and components of dealkalized red mud were tested.

The test was conducted according to the method in Embodiment 8, and the control test was constructed according to the methods in Embodiments 1 to 7. Desulfurization rates of flue gas, Fe and Al recovery rates, and components of dealkalized red mud were tested. The results were shown in Table 1 and Table 2.

TABLE 1

A relationship between a blast rate and a desulfurization rate when a reflux rate is 1/5

| Blast rate ($m^3/h$) | 0.4 | 1 | 1.5 | 2 | 3 |
|---|---|---|---|---|---|
| Desulfurization rate | 97.45% | 97.05% | 96.87% | 96.55% | 96.10% |

TABLE 2

A relationship between a reflux rate and a desulfurization rate when a blast rate is 3 $m^3/h$

| Reflux rate | 1/5 | 1/4 | 1/3 | 1/2 |
|---|---|---|---|---|
| Desulfurization rate | 96.10% | 96.54% | 97.03% | 97.55% |

Through test, in Embodiments 1 to 8, an average recovery rate of $Fe_2O_3$ reached 89.79%, and an average recovery rate of $Al(OH)_3$ reached 79.30%. 100 g of dealkalized red mud was subject to secondary grinding, washed with deionized water repeatedly until the washing solution is neutral, and then dried thoroughly. A sample of the dried dealkalized red mud was acquired, and the content of $Na_2O$ and $K_2O$ of the sample was determined by a method for chemical analysis of bauxite in GBT3257.9-1999: a flame atomic absorption spectrophotometric method. The result showed that in the dealkalized red mud, the average content of $Na_2O$ was 0.87% (wt) and the average content of $K_2O$ was 0.39% (wt). In this way, Fe and Al in red mud are recovered and utilized, and the efficient desulfurization of flue gas and dealkalization of red mud are implemented. Therefore, the method is a new method and process that can implement comprehensive treatment and turn waste into treasure.

What is claimed is:

1. A method for aluminum-enhanced dealkalization of red mud and separation and recovery of aluminum and iron, comprising the following steps:
   S1: grinding red mud and dissolving the red mud in slurry liquid, wherein the slurry liquid is water and/or alkaline leachate obtained after filtering; uniformly stirring the mixture to obtain red mud slurry; introducing $SO_2$ and $O_2$ for aeration oxidation to obtain a red mud mixture; and filtering the red mud mixture to obtain dealkalized red mud and acidic leachate; and
   S2: adjusting pH of the acidic leachate obtained by filtering to a strongly alkaline level to obtain alkaline leachate; filtering the alkaline leachate to obtain alkaline leachate after filtering and filter residue; drying and sintering the filter residue, washing an obtained product with water, and conducting drying to recover $Fe_2O_3$; returning ⅕-½ of the alkaline leachate after filtering to step (1) as the slurry liquid; and adjusting pH of the remaining alkaline leachate after filtering to a weakly acidic level, and conducting filtering to separate and recover $Al(OH)_3$.

2. The method for aluminum-enhanced dealkalization of red mud and separation and recovery of aluminum and iron according to claim 1, wherein in step (1), the red mud is ground into a particle size of 100-200 meshes.

3. The method for aluminum-enhanced dealkalization of red mud and separation and recovery of aluminum and iron according to claim 1, wherein a liquid-solid ratio of the red mud slurry is 7:1.

4. The method for aluminum-enhanced dealkalization of red mud and separation and recovery of aluminum and iron according to claim 1, wherein in step (1), $SO_2$ is introduced by allowing the $SO_2$ gas to be in reverse contact with the red mud slurry for absorption.

5. The method for aluminum-enhanced dealkalization of red mud and separation and recovery of aluminum and iron according to claim 1, wherein in step (1), the introduction amount of the $SO_2$ gas is 1-12 L per $m^3$ of the red mud slurry.

6. The method for aluminum-enhanced dealkalization of red mud and separation and recovery of aluminum and iron according to claim 1, wherein in step (1), an introduction volume ratio of the $O_2$ gas to the $SO_2$ gas is 1:(1-5).

7. The method for aluminum-enhanced dealkalization of red mud and separation and recovery of aluminum and iron according to claim 1, wherein washing needs to be conducted 3-8 times after filtering.

8. The method for aluminum-enhanced dealkalization of red mud and separation and recovery of aluminum and iron according to claim 1, wherein in step (1), pH of the red mud mixture needs to be below 3.

9. The method for aluminum-enhanced dealkalization of red mud and separation and recovery of aluminum and iron according to claim 1, wherein in step (2), pH of the alkaline leachate needs to be above 13.

10. The method for aluminum-enhanced dealkalization of red mud and separation and recovery of aluminum and iron according to claim 1, wherein in step (2), the weak acidity means that pH needs to be above 4.7.

* * * * *